Jan. 6, 1942. E. MAZUR 2,268,606
RELEASE MECHANISM FOR FLUID BRAKE SYSTEMS
Filed May 11, 1940
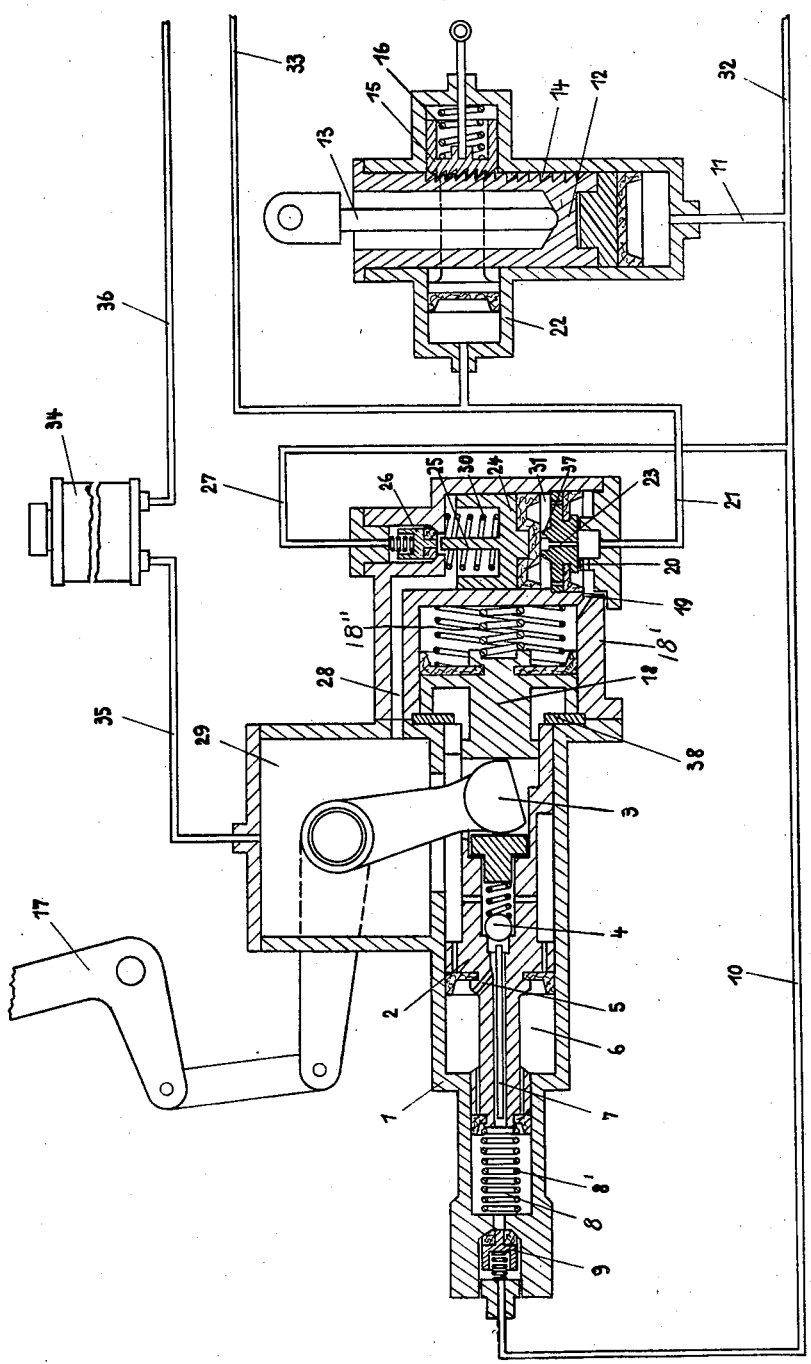
Inventor
Erwin Mazur
By Sommers + Young
Attorneys Patented Jan. 6, 1942

2,268,606

UNITED STATES PATENT OFFICE 2,268,606

RELEASE MECHANISM FOR FLUID BRAKE SYSTEMS

Erwin Mazur, Frankfort-on-the-Main, Germany

Application May 11, 1940, Serial No. 334,621
In Germany June 8, 1939

7 Claims. (Cl. 188—151)

This invention relates to fluid-operated brake control systems for vehicles which have brakes and particularly to brake release devices for such systems, the present system being particularly suitable for vehicles adapted to travel on rails.

Brake operating apparatus is well known in which braking is effected hydraulically by means of a pressure generator, through a special system of hydraulic conduits. As pressure generators, use can be made of main or master cylinders in which the piston describes only one stroke, as well as pumps in which a pressure medium is forced repeatedly or periodically into the brake-applying system by the reciprocatory action of the piston of the pump. In apparatus of the latter type special check or locking devices are necessary, for example check valves or other mechanical check or lock devices which, on return movement of the pump piston, prevent return of the brake apparatus or brake piston. It is also old to provide an additional or accessory device for releasing the check or lock mechanism on termination of the braking operation, said release device comprising a releasing piston which acts on a pressure medium, and which is actuated by a pedal. The released brake piston can return to its non-operative position through the action, for example, of a spring interposed in the brake rod arrangement. On release of the lock device, or on opening of the check valve, the main or master braking cylinder is allowed to return to non-braking position and the braking fluid is permitted to flow back, whereby the pressure in the hydraulic braking-force transmission conduit system is relieved.

The previously-known arrangements of this type are defective in that two devices must be actuated successively for releasing the brake: first, the lock mechanism must be completely released, as otherwise, on premature removal of the braking pressure, the entire braking rod force would be exerted on the locking mechanism, whereby either the release of the brake piston would be prevented or the incompletely released lock mechanism would be damaged. After termination of the release operations the brake pressure conduit system must also be relieved of load, so that the springs of the brake rods can move the brake-applying pistons to their initial positions.

In order to overcome these defects, according to the invention the release system is combined with the master brake-applying system so that a release valve of the brake-applying system is controlled by the pressure of the release system. For example, the pressure in the release system may act on a control piston, a control diaphragm, a resilient member or the like, which, mechanically, opens the release valve of the master brake-applying system controlling the return to the fluid reservoir. According to the present invention, the control piston for the release valve and the operating piston of the lock mechanism are in such relation to each other that when pressure is generated in the release system the lock mechanism is first released and only thereafter is the control piston for the release valve actuated. In order to facilitate the procedure, according to the invention, the control piston for the release valve can be applied on a seat in such manner that at first only a portion of the piston surface is acted on by the pressure of the release system, while with increasing pressure, the piston is then raised from its seat, whereupon the pressure acts on the entire piston surface.

According to the invention, the piston of the releasing system can be actuated either from the operating lever of the pressure generator of the brake-applying system or by means of a hand lever or pedal entirely independent of the brake-applying apparatus. In the first case the release cylinder is preferably combined into an operative aggregate with the pressure generator of the brake-applying system, and particularly may be arranged co-axially therewith.

An exemplary embodiment of the invention is shown on the accompanying drawing in which the combined braking and releasing system is shown somewhat diagrammatically and certain parts are shown in section.

The brake-applying system includes a stepped piston 2 slidably disposed in known manner in a main or master cylinder housing 1 and adapted to be actuated manually or otherwise by a lever 3. The cut-off valve 4 of the stepped piston is contacted through the bore 5 by the pressure of the fluid in the low pressure space 6, and also by the pressure of the high pressure fluid in the high pressure space 8, acting through a pin 7 which is fluid-tightly slidable in an axial bore of piston 2. When in non-operating position the rear end of the piston 2 is held in engagement with abutment 38 by spring 8' acting on the forward end of piston 2.

The fluid under the pressure generated in the main cylinder 1 is forced through a check valve 9 into a passage 10, through the passage 11, and is applied to the pitson 12 of a braking motor, which acts on the braking apparatus of a wheel through a rod 13 and possibly through other linkage or mechanism engaged therewith.

Brake-applying piston 12 is provided, along one side, with teeth 14 in which the teeth of a piston 15 of a locking motor are adapted to engage. The piston 15 is subject to the action of a spring 16 tending to hold it in engagement with brake piston 12.

Braking is effected by actuating the lever 17 one or more times, this lever 17 acting on the lever 3. At each piston stroke braking rod 13 is moved. Return of the fluid, on the backward motion of the repeated piston strokes, is prevented by the check valve 9, and, also, piston 12 is locked by the mechanically operating locking piston 15.

In order to provide for release of the brakes and locking mechanism a releasing pump comprising a cylinder 18' and piston 18 is disposed coaxially with the stepped piston 2 in housing 1, said piston 18 being adapted to be moved by lever 3 in a direction opposite that of the main or master cylinder piston 2. Normally, when not in operation, said piston 18 rests in its rearward position against the abutment 38 at the rear end of cylinder 18', in which position it is normally pressed by spring 18" which acts on the forward face of the piston. The fluid expelled from cylinder 18' by forward movement of said piston 18 passes through bores 19 and 20 as well as passage 21 of the releasing piston into the releasing cylinder 22, in which the locking piston 15 is slidably disposed. Through the action of piston 15 against the force of spring 16 the lock mechanism can be released.

The fluid of the releasing system also acts through bore 23 on a control piston 24 which is provided with a control member 25 which latter, on movement of the piston 24, can open the check valve 26, whereby the connection of the brake-applying conduit 10 is established through passage 27, and bore 28, with the fluid reservoir 29, into which the pressure fluid can discharge from the brake-applying system.

The operation of the releasing apparatus is as follows:

The pressure produced by movement of piston 18 first moves piston 15 and thereby disengages the locking device from the brake-applying piston 12. On further increase of the pressure by movement of lever 17, the pressure in passage 23 can raise the control piston 24 from its seat, against the action of spring 30 which offers a stronger resistance to movement of piston 24 than spring 16 offers to piston 15. The fluid pressure then acts on the entire surface of piston 24 in the chamber 31. As a result of the large area of surface then contacted, the control piston 24 can raise valve 26 notwithstanding the pressure of passage 27 acting thereon in the opposite direction, whereby the braking apparatus is completely relieved of load to the fluid reservoir 29.

The invention can also be used with vehicles in which the brakes are operated from two different points, for example, from two drivers' seats. In such case, a conduit 32 of the brake conduit 10 leads to the master cylinder and to the braking cylinders of the other driver's seat, and a conduit 33 of the releasing system to the lock-releasing cylinder of the second service point.

For regulating the fluid, an additional reservoir 34 can be provided, and which supplies the reservoir 29 through a passage 25, and which can be connected through passage 36 with the reservoir of a second operating mechanism.

I claim:

1. In a fluid brake-operating system for vehicles having brakes, a brake-applying system comprising a master cylinder having a piston, a braking motor connected with a brake-applying rod, and a conduit for transmitting pressure fluid from said master cylinder to said braking motor when the piston of the master cylinder is moved forwardly with respect to said cylinder; means for locking the braking motor against return movement to brake-releasing position; a fluid releasing system for releasing said braking motor, said releasing system comprising a cylinder having a piston adapted to be manually actuated to apply pressure in said releasing system, a releasing motor mechanically connected to said locking means, and a conduit connecting said releasing cylinder with said releasing motor; a valve in said brake-applying system, and means in said releasing system responsive to the pressure therein for opening said valve to release the pressure in the brake-applying system to release the brakes.

2. In a fluid brake-operating system for vehicles having brakes, a brake-applying system comprising a master cylinder having a piston, a braking motor connected with a brake-applying rod, and a conduit for transmitting pressure fluid from said master cylinder to said braking motor when the piston of the master cylinder is moved forwardly with respect to said cylinder; means for locking the braking motor against return movement to brake-releasing position; a fluid releasing system for releasing said braking motor, said releasing system comprising a cylinder having a piston adapted to be manually actuated to apply pressure in said releasing system, a releasing motor mechanically connected to said locking means, and a conduit connecting said releasing cylinder with said releasing motor; a fluid reservoir connected with said brake-applying system, a valve in said brake-applying system closing off said reservoir from said brake-applying system, and a control piston in said brake-releasing system subjected to the pressure therein mechanically connected with said valve when the piston is actuated for releasing the pressure in the brake-applying system to said reservoir when the pressure in said releasing system reaches a predetermined pressure.

3. In a fluid brake-operating system for vehicles having brakes, a brake-applying system comprising a master cylinder having a piston, a braking motor connected with a brake-applying rod, and a conduit for transmitting pressure fluid from said master cylinder to said braking motor when the piston of the master cylinder is moved forwardly with respect to said cylinder; means for locking the braking motor against return to brake-releasing position; a fluid releasing system for releasing said braking motor, said releasing system comprising a cylinder having a piston adapted to be manually actuated to apply pressure in said releasing sytesm, a releasing motor mechanically connected to said locking means, and a conduit connecting said releasing cylinder with said releasing motor; a fluid reservoir connected with said brake-applying system, a valve in said brake-applying system closing off said reservoir from said brake-applying system, a control piston in said brake-releasing system subjected to the pressure therein mechanically connected with said valve when the piston is actuated for releasing the pressure in the brake-applying system to said reservoir when the pressure in said releasing system reaches a predetermined pressure, means opposing actuation of the lock-releasing motor, and means opposing actuation of said valve control piston, the resistance to operation of the means opposing actuation of said lock-releasing means being relatively less than the resistance of said valve control piston whereby the brake-applying motor is unlocked before its operating pressure is released.

4. In a fluid brake-operating system for vehicles having brakes, a brake-applying system comprising a master cylinder having a piston, a braking motor connected with a brake-applying rod, and a conduit for transmitting pressure fluid from said master cylinder to said braking motor when the piston of the master cylinder is moved forwardly with respect to said cylinder; means for locking the braking motor against return movement to brake-releasing position; a fluid releasing system for releasing said braking motor, said releasing system comprising a cylinder having a piston adapted to be manually actuated to apply pressure in said releasing system, a releasing motor mechanically connected to said locking means, and a conduit connecting said releasing cylinder with said releasing motor; a fluid reservoir connected with said brake-applying system, a valve in said brake-applying system closing off said reservoir from said brake-applying system, a control piston in said brake-releasing system, means for normally shutting off part of the area of said control piston from the pressure in said releasing system, and a spring acting on said control piston in the opposite direction to the pressure of the releasing system, said control piston having means for mechanically contacting said valve when the piston is actuated, when the releasing fluid pressure acting on the remaining area of the control piston is sufficient to overcome the force of said spring, said control piston moving away from said shutting-off means when the releasing pressure overcomes the spring pressure and the entire area of said control piston being contacted by said releasing pressure, whereby said control piston, acting through said mechanical means, opens said valve and releases the pressure in the brake-applying system so that the brakes are released.

5. In a fluid braking system for vehicles, a brake-applying system comprising a master pump having a cylinder and a piston, a manually operable lever for moving the cylinder and piston relatively to effect a pumping operation to apply pressure in the brake-applying system, a brake-applying motor, and a conduit connecting said brake-applying pump with said brake-applying motor; means for locking said brake-applying motor against brake-releasing movement; a fluid brake-releasing system comprising a releasing pump fixed with respect to the brake-applying pump and operable by said lever by movement of said lever in the opposite direction from a brake-applying movement thereof, a brake-releasing motor mechanically connected with said locking means, and a conduit connecting said releasing pump with said releasing motor; a valve in said brake-applying system, and pressure-responsive means in said releasing system for opening said valve to release the pressure in the brake-applying system to release the brakes.

6. In a fluid brake-operating system for vehicles having brakes, a brake-applying system comprising a master cylinder having a piston, a braking motor connected with a brake-applying rod, and a conduit for transmitting pressure fluid from said master cylinder to said braking motor when the piston of the master cylinder is moved forwardly with respect to said cylinder; means for locking the braking motor against return movement to brake-releasing position; a fluid releasing system for releasing said braking motor, said releasing system comprising a cylinder having a piston adapted to be manually actuated to apply pressure in said releasing system, a releasing motor mechanically connected to said locking means, and a conduit connecting said releasing cylinder with said releasing motor; a manually operable lever for actuating the piston and cylinder of the releasing system relatively to one another, independently of the brake-applying system; a valve in said brake-applying system, and means in said releasing system responsive to the pressure therein for opening said valve to release the pressure in the brake-applying system to release the brakes.

7. In a fluid brake-operating system for vehicles having brakes, a brake-applying system comprising a master cylinder having a piston, an abutment for limiting the rearward movement of said piston; a braking motor, means for connecting said braking motor with the vehicle brakes, a conduit for transmitting pressure fluid from said master cylinder to said braking motor when the piston of the master cylinder is moved forwardly with respect to said cylinder; means for locking the braking motor against return movement to brake-releasing position; a fluid releasing system for releasing said braking motor, said releasing system comprising a cylinder having a piston adapted to be manually actuated to apply pressure in said releasing system, a releasing motor mechanically connected to said locking means, and a conduit connecting said releasing cylinder with said releasing motor; a valve in said brake-applying system, and means in said releasing system responsive to the pressure therein for opening said valve to release the pressure in the brake-applying system to release the brakes.

ERWIN MAZUR.